(12) United States Patent
Boissy et al.

(10) Patent No.: US 12,288,477 B2
(45) Date of Patent: Apr. 29, 2025

(54) SYSTEM FOR SIMULATING CERVICAL SPINE MOTIONS

(71) Applicant: SOCIETE DE COMMERCIALISATION DES PRODUITS DE LA RECHERCHE APPLIQUÉE SOCPRA SCIENCES ET GÉNIE S.E.C., Sherbrooke (CA)

(72) Inventors: Patrick Boissy, Sherbrooke (CA); Mathieu Hamel, Magog (CA); François Cabana, Saint-Denis-de-Brompton (CA); Karina Lebel, Sherbrooke (CA)

(73) Assignee: SOCIETE DE COMMERCIALISATION DES PRODUITS DE LA RECHERCHE APPLIQUÉE SOCPRA SCIENCES ET GÉNIE S.E.C., Sherbrooke (CA)

( * ) Notice: Subject to any disclaimer, the term of this patent is extended or adjusted under 35 U.S.C. 154(b) by 0 days.

(21) Appl. No.: 18/320,278

(22) Filed: May 19, 2023

(65) Prior Publication Data

US 2023/0290281 A1  Sep. 14, 2023

Related U.S. Application Data

(63) Continuation of application No. 16/757,437, filed as application No. PCT/CA2018/051334 on Oct. 22, 2018, now Pat. No. 11,694,579.
(Continued)

(51) Int. Cl.
*G09B 23/30* (2006.01)
*G09B 23/32* (2006.01)

(52) U.S. Cl.
CPC .......... *G09B 23/32* (2013.01); *G09B 23/303* (2013.01)

(58) Field of Classification Search
CPC ........ G09B 23/28; G09B 23/30; G09B 23/32; A63H 3/46
See application file for complete search history.

(56) References Cited

U.S. PATENT DOCUMENTS 3,557,471 A * 1/1971 Payne ................... G09B 23/32
434/270
3,707,782 A    1/1973 Alderson
(Continued)

FOREIGN PATENT DOCUMENTS

FR    2839803 A1    11/2003
WO   2008018889 A2   2/2008
(Continued)

*Primary Examiner* — Kurt Fernstrom
(74) *Attorney, Agent, or Firm* — NORTON ROSE FULBRIGHT CANADA LLP

(57) ABSTRACT

A neck mechanism for a mannequin comprises three or more joint units serially connected to provide joints for three or more rotational degrees of freedom (DOF). A rotational axis of a first DOF is configured to be aligned with a lateral axis of the mannequin. A rotational axis of a second DOF is configured to be aligned with an anterior-posterior axis of the mannequin. A rotational axis of a third DOF is configured to be aligned with a cranial-caudal axis of the mannequin. A bottom one of the joint units is adapted to be connected to a torso of the mannequin, and a top one of the at least three joint units is adapted to be connected to a skull. The mannequin may also have a skull connected to the top one of the joint units, and a trunk connected to the bottom one of the joint units. A system for simulating cervical spine motions is also provided.

20 Claims, 11 Drawing Sheets

Related U.S. Application Data

(60) Provisional application No. 62/575,016, filed on Oct. 20, 2017.

(56) References Cited

U.S. PATENT DOCUMENTS

| | | | |
|---|---|---|---|
| 3,762,070 A | 10/1973 | Culver | |
| 4,948,373 A | 8/1990 | Engels | |
| 4,993,378 A | 2/1991 | Sakurahara | |
| 5,018,977 A | 5/1991 | Wiley | |
| 5,823,787 A | 10/1998 | Gonzalez | |
| 6,189,637 B1 | 2/2001 | Tosaka | |
| 6,267,640 B1 * | 7/2001 | Akashi | G09B 23/32 446/376 |
| 6,957,961 B1 * | 10/2005 | Owens | G09B 23/30 434/270 |
| 7,780,451 B2 * | 8/2010 | Willobee | G09B 23/32 434/267 |
| 8,382,485 B2 | 2/2013 | Bardsley | |
| 8,439,688 B2 * | 5/2013 | Wilkins | G09B 23/30 434/262 |
| 9,129,535 B2 * | 9/2015 | Takasu | G09B 23/32 |
| 9,251,720 B2 | 2/2016 | Ozawa | |
| 9,972,220 B2 | 5/2018 | Wang | |
| 2003/0041815 A1 | 3/2003 | Kawakubo | |
| 2008/0286736 A1 * | 11/2008 | Browne-Wilkinson | G09B 23/32 623/18.11 |
| 2009/0143158 A1 | 6/2009 | Fidge | |
| 2010/0003657 A1 | 1/2010 | Shibui | |
| 2011/0207102 A1 * | 8/2011 | Trotta | G09B 23/281 434/267 |
| 2012/0156665 A1 * | 6/2012 | Samosky | G09B 23/285 434/262 |
| 2012/0276509 A1 * | 11/2012 | Iannotti | A61B 17/1739 434/267 |
| 2013/0122478 A1 * | 5/2013 | Takasu | G09B 23/34 434/275 |
| 2013/0196303 A1 * | 8/2013 | Takasu | G09B 23/28 434/274 |
| 2014/0106326 A1 * | 4/2014 | Hemmer | G09B 23/283 434/264 |
| 2014/0190280 A1 * | 7/2014 | Been | G09B 23/32 73/866.4 |
| 2014/0294485 A1 * | 10/2014 | McInnis | G09B 23/32 403/56 |
| 2015/0004583 A1 * | 1/2015 | Lavigueur | G09B 23/34 434/267 |
| 2017/0113153 A1 * | 4/2017 | Kimura | A63H 3/48 |
| 2018/0136083 A1 * | 5/2018 | Wang | G01M 17/0078 |
| 2019/0019434 A1 | 1/2019 | Hastings | |
| 2020/0030034 A1 * | 1/2020 | Kontaxis | A61F 2/3094 |

FOREIGN PATENT DOCUMENTS

| | | | |
|---|---|---|---|
| WO | WO-2015111186 A1 * | 7/2015 | G09B 23/30 |
| WO | 2017123852 A1 | 7/2017 | |

* cited by examiner

SYSTEM FOR SIMULATING CERVICAL SPINE MOTIONS

CROSS-REFERENCE TO RELATED APPLICATION

The present application claims the priority of U.S. Patent Application No. 62/575,016, filed on Oct. 20, 2017 and incorporated herein by reference.

TECHNICAL FIELD

The present disclosure pertains to a method and system for evaluating cervical spine stabilization in patient transfer training, and for evaluating tracheal intubation and/or direct laryngoscopy maneuvering techniques.

BACKGROUND OF THE ART

Patients with suspected spinal cord injuries undergo numerous transfers throughout treatment and care. Effective cervical spine (c-spine) stabilization is crucial to minimize the impacts of the suspected injury. Healthcare professionals are trained to perform transfers using simulation. However, the feedback on the maneuvers is often subjective, i.e., it is performed by an on-site evaluator that visually assesses whether the maneuvers are adequate.

Also, c-spine motion may result by the difficulty of rescuers to maintain head and trunk alignment during a rotation step of a transfer motion, in addition to the difficulty in initiating specific phases of the motion synchronously when multiple rescuers perform transfers. It may be difficult for an evaluator to do a proper visual assessment considering rapidity of a rotation step and number of participants.

SUMMARY

It is an aim of the present disclosure to provide a novel system for simulating cervical spine motions.

It is a further aim of the present disclosure to use the system for simulating cervical spine motions for evaluating tracheal intubation maneuvers and/or direct laryngoscopy maneuvers.

Therefore, in accordance with a first embodiment of the present disclosure, there is provided a neck mechanism for a mannequin comprising: at least three joint units serially connected to provide joints for at least three rotational degrees of freedom (DOF), with a rotational axis of a first DOF configured to be aligned with a lateral axis of the mannequin, a rotational axis of a second DOF configured to be aligned with an anterior-posterior axis of the mannequin, and a rotational axis of a third DOF configured to be aligned with a cranial-caudal axis of the mannequin, wherein a bottom one of the at least three joint units is adapted to be connected to a torso of the mannequin, and a top one of the at least three joint units is adapted to be connected to a skull.

Further in accordance with the first embodiment, for example, the bottom one of the at least three joint units is adapted to be connected to the torso of the mannequin with the second DOF.

Still further in accordance with the first embodiment, for example, the top one of the at least three joint units is adapted to be connected to a skull by the third DOF.

Still further in accordance with the first embodiment, for example, four joint units, provide concurrently four rotational DOFs, wherein a rotational axis of a fourth DOF is configured to be aligned with the lateral axis of the mannequin.

Still further in accordance with the first embodiment, for example, the rotational axes of the first DOF and of the fourth DOF are parallel and spaced apart to another.

Still further in accordance with the first embodiment, for example, the rotational axes of the first DOF and of the fourth DOF are parallel and spaced apart relative to the rotational axis of the second DOF.

Still further in accordance with the first embodiment, for example, a rotary motion sensor is at each said joint unit.

In accordance with a second embodiment of the present disclosure, there is provided a mannequin comprising: the neck mechanism as described above; a skull connected to the top one of the at least three joint units; and a trunk connected to the bottom one of the at least three joint units.

Further in accordance with the second embodiment, for example, the trunk has a plurality of metal plates emulating a volume and/or a weight of an anatomical skull.

Still further in accordance with the second embodiment, for example, the skull has a disk ring connected to a shaft of the top one of the at least three joint units.

Still further in accordance with the second embodiment, for example, elastics connect the skull to the trunk.

Still further in accordance with the second embodiment, for example, an airway simulator apparatus has at least one tube defining at least one opening at a level of a face of the mannequin, and being in fluid communication with at least one expandable balloon in the trunk.

Still further in accordance with the second embodiment, for example, the airway simulator apparatus includes a mouthpiece connected to the at least one tube at the at least one opening.

Still further in accordance with the second embodiment, for example, the at least one tube includes at least one nose tube having an opening defining a nostril.

Still further in accordance with the second embodiment, for example, the at least one tube diverges into at least two tracheal tubes, with one said expandable balloon at an end of each said tracheal tube.

Still further in accordance with the second embodiment, for example, the at least one tube diverges into an oesophageal tube, with one said expandable balloon at an end of the oesophageal tube.

Still further in accordance with the second embodiment, for example, the at least one tube is flexible tubing.

Still further in accordance with the second embodiment, for example, the at least one tube is connected to the skull.

Still further in accordance with the second embodiment, for example, the trunk comprises an articulated skeleton.

Still further in accordance with the second embodiment, for example, at least the neck mechanism, the skull and the trunk are covered by a skin membrane.

In accordance with a third embodiment of the present disclosure, there is provided a system for simulating cervical spine motions, the system comprising: a mannequin having a neck mechanism between a torso and a skull, the neck mechanism having at least three degrees of freedom (DOF); sensors to detect cervical spine orientation changes; a processing unit having an orientation calculator module to quantify the cervical spine orientation changes from readings of the sensors, and a performance assessor module to assess the cervical spine motions using the quantified cervical spine orientation changes; and an output for outputting an assessment and/or the cervical spine orientation changes.

Further in accordance with the third embodiment, for example, the neck mechanism has at least three joint units serially connected to provide joints for at least three rotational degrees of freedom (DOF), with a rotational axis of a first DOF configured to be aligned with a lateral axis of the mannequin, a rotational axis of a second DOF configured to be aligned with an anterior-posterior axis of the mannequin, and a rotational axis of a third DOF configured to be aligned with a cranial-caudal axis of the mannequin, wherein a bottom one of the at least three joint units is adapted to be connected to a torso of the mannequin, and a top one of the at least three joint units is adapted to be connected to a skull.

Still further in accordance with the third embodiment, for example, the bottom one of the at least three joint units is adapted to be connected to the torso of the mannequin with the second DOF.

Still further in accordance with the third embodiment, for example, the top one of the at least three joint units is adapted to be connected to a skull by the third DOF.

Still further in accordance with the third embodiment, for example, four joint units, provide concurrently four rotational DOFs, wherein a rotational axis of a fourth DOF is configured to be aligned with the lateral axis of the mannequin.

Still further in accordance with the third embodiment, for example, the rotational axes of the first DOF and of the fourth DOF are parallel and spaced apart to another.

Still further in accordance with the third embodiment, for example, the rotational axes of the first DOF and of the fourth DOF are parallel and spaced apart relative to the rotational axis of the second DOF.

Still further in accordance with the third embodiment, for example, the sensors include a rotary motion sensor at each said joint unit.

Still further in accordance with the third embodiment, for example, the skull is connected to the top one of the at least three joint units; and the trunk is connected to the bottom one of the at least three joint units.

Still further in accordance with the third embodiment, for example, the trunk has a plurality of metal plates emulating a volume and/or a weight of an anatomical skull.

Still further in accordance with the third embodiment, for example, the skull has a disk ring connected to a shaft of the top one of the at least three joint units.

Still further in accordance with the third embodiment, for example, elastics connect the skull to the trunk.

Still further in accordance with the third embodiment, for example, an airway simulator apparatus has at least one tube defining at least one opening at a level of a face of the mannequin, and being in fluid communication with at least one expandable balloon in the trunk, the performance assessor module assessing an airway alignment for direct laryngoscopy and/or tracheal intubation using the quantified cervical spine orientation changes.

Still further in accordance with the third embodiment, for example, the airway simulator apparatus includes a mouthpiece connected to the at least one tube at the at least one opening.

Still further in accordance with the third embodiment, for example, the at least one tube includes at least one nose tube having an opening defining a nostril.

Still further in accordance with the third embodiment, for example, the at least one tube diverges into at least two tracheal tubes, with one said expandable balloon at an end of each said tracheal tube.

Still further in accordance with the third embodiment, for example, the at least one tube diverges into an oesophageal tube, with one said expandable balloon at an end of the oesophageal tube.

Still further in accordance with the third embodiment, for example, the at least one tube is flexible tubing.

Still further in accordance with the third embodiment, for example, the at least one tube is connected to the skull.

Still further in accordance with the third embodiment, for example, the trunk comprises an articulated skeleton.

Still further in accordance with the third embodiment, for example, at least the neck mechanism, the skull and/or the trunk are covered by a skin membrane.

DETAILED DESCRIPTION

Figure 1:
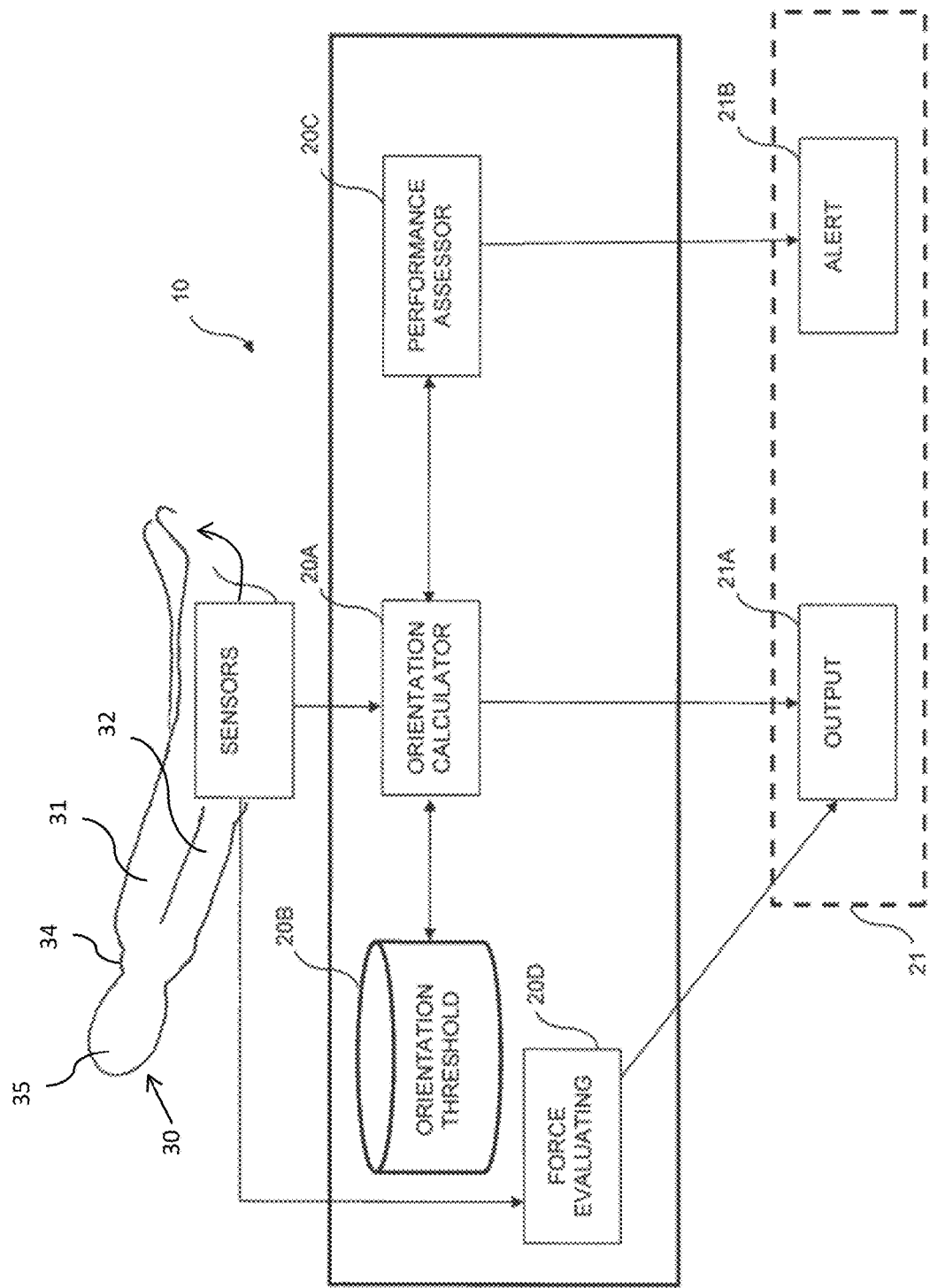
FIG. 1 is a block diagram of a system for simulating cervical spine motions.

Referring to the drawings and more particularly to FIG. 1, there is illustrated a system for simulating cervical spine motions at 10, as resulting from cervical spine manipulations for example. The system 10 is of the type having a processing unit 20 used to quantify the manipulations of a mannequin 30, also known as a dummy, etc. The processing unit 20 is of the type having a non-transitory computer-readable memory communicatively coupled to it and comprising computer-readable program instructions executable by the processing unit 20 to perform numerous functions related to the simulation of cervical spine motions. As shown in FIG. 1, the processing unit 20 may have various modules to perform these functions. The system 10 receives data from sensors generically shown as A in FIG. 1 but described in further detail hereinafter. The sensors A may be any appropriate type of sensor to measure various movements of the mannequin 30 and other parameters such as forces applied to mannequin 30. An interface 21 may be operatively connected to the processing unit 20 to output quantitative data representative of the transfer manipulations, or airway management during tracheal intubation and/or direct laryngoscopy maneuvers, and may communicate with the operators of the system 10 to warn or alarm them of excessive or improper manipulations. The interface 21 may be a monitor, screen, tablet, etc.

The processing unit 20 may have an orientation calculator module 20A receiving the data from the sensors A. The orientation calculator module 20A may determine orientation variations sustained by the neck of the mannequin 30 during manipulations. For example, the orientation calculator module 20A may quantify variations in flexion angle values about one or more flexion axes, about lateral axes of the mannequin 30. The orientation calculator module 20A may also quantify lateral flexions as well, i.e., about an anterior-posterior axis of the mannequin 30. As yet another orientation value that may be calculated by the orientation calculator module 20A, the rotation may be obtained as well, namely an orientation of a skull relative to a torso along a vertical or cranial-caudal axis of the mannequin 30. All of these variations of angle values may be in the form of angular rates of change about various axes.

Figure 6:
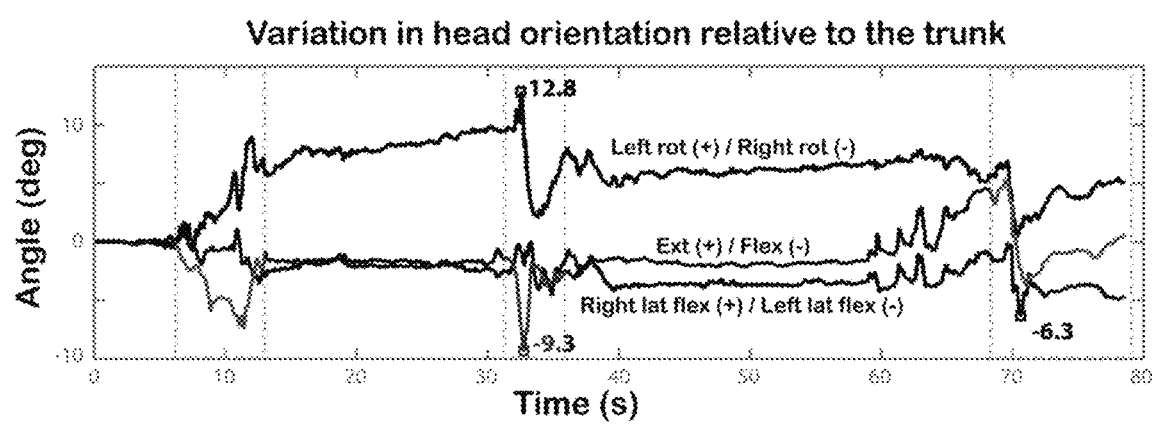
FIG. 6 is a graph showing an output of the system of FIG. 1.

The orientation calculator module 20A may provide an output 21A as a visual display on the interface 21, or in the form of a data file for any given training session. In accordance with an embodiment, the output 21A is in the form of the graph of FIG. 6 to indicate the angle or angular rates of change for a user to get a quantitative assessment of manipulations being performed. The graph of FIG. 6 shows a timescale which can be matched with data pertaining to the various manipulations such that a user may see the angles and angular rates of change resulting from various manipulations.

The processing unit 20 may be programmed with an orientation threshold database 20B so as to determine what constitutes permitted versus excessive manipulations. Hence, the orientation calculator module 20A may provide measured angular rates of change and receive threshold values from the orientation threshold database 20B. A performance assessor 20C may then determine whether the movements performed exceed the values programmed into the orientation threshold database 20B, in which case it may be determined that an excessive or improper transfer manipulation of the mannequin 30 has been performed. It may also or alternatively be determined that an excessive or improper intubation or laryngoscopy manipulation of the mannequin 30 has been performed, for instance by the mannequin 30 being too far aligned related to a sniffing position. The performance assessor module 20C may therefore indicate in real time that manipulations have been improper.

The performance assessor module 20C, when identifying an excessive or improper manipulation by measured values exceeding beyond those of the orientation threshold database 20B, may alert the operator of the system 10 via the alert 21B of the interface 21, or may provide quantitative data relative to accepted values, such as a sniffing position. This is an advantage over methods in which the quantitative data is provided at a later point, in that corrective measures may be taken right away to practice by re-manipulating the mannequin 30 for a proper manipulation. Moreover, the orientation threshold database 20B may have various thresholds to provide more than a binary "proper" vs "excessive" assessment. For example, preliminary signals may be emitted to warn the operators of an impending excessive manipulation, for the operators to correct their movements, for instance by slowing down manipulations, and/or by reorienting the mannequin 30. Such system interventions may provide real time feedback to the operators during training, for the operators to be capable of understanding the manipulations that are not done correctly.

The processor unit 20 may also have a force evaluating module 20D receiving signals from the sensors A to calculate the forces to which the mannequin 30 is exposed. For example, the sensors A may include inertial sensors (e.g., accelerometers) producing data indicative of the forces sustained by the mannequin 30 during the manipulations. The sensors A may include pressure sensors (e.g., manometers) for an airway simulator apparatus, as detailed hereinafter.

The mannequin 30 is generally shown in FIG. 1 as having a torso 31, or trunk, limbs 32, a neck 34 and a head 35. In order for the system 10 to provide a realistic simulation of cervical spine motions, the mannequin 30 may be similar to the human body in terms of weight, dimensions, flexibility, center of mass, and/or range of motion. While the system 10 focusses on simulating the cervical spine motions and providing data relative to neck movement, it is observed that torso 31 manipulations may affect the cervical spine stability. Therefore, by having the mannequin 30 emulating a human body in terms of weight, dimensions, flexibility, center of mass, and/or range of motion, transfer motions of the mannequin 30 may be realistic and therefore simulate adequately cervical spine motions. As part of sensors A, it is contemplated to provide various inertial sensors on or in the mannequin 30, for instance to evaluate the forces of movement of the mannequin 30 when some specific transfer motions are done such as rotating the mannequin 30, using the force evaluating module 20D.

Referring to FIGS. 2 to 5, a neck mechanism of the mannequin 30 is shown at 40, while a skull is shown at 50. The neck mechanism 40 interfaces the skull 50 to the torso 31. According to an embodiment, the neck mechanism 40 and skull 50 are covered by a material, layers, or like cover emulating soft tissue, but the covering material is removed from FIGS. 2-5 to better illustrate the neck mechanism 40 and skull 50.

Figure 2:
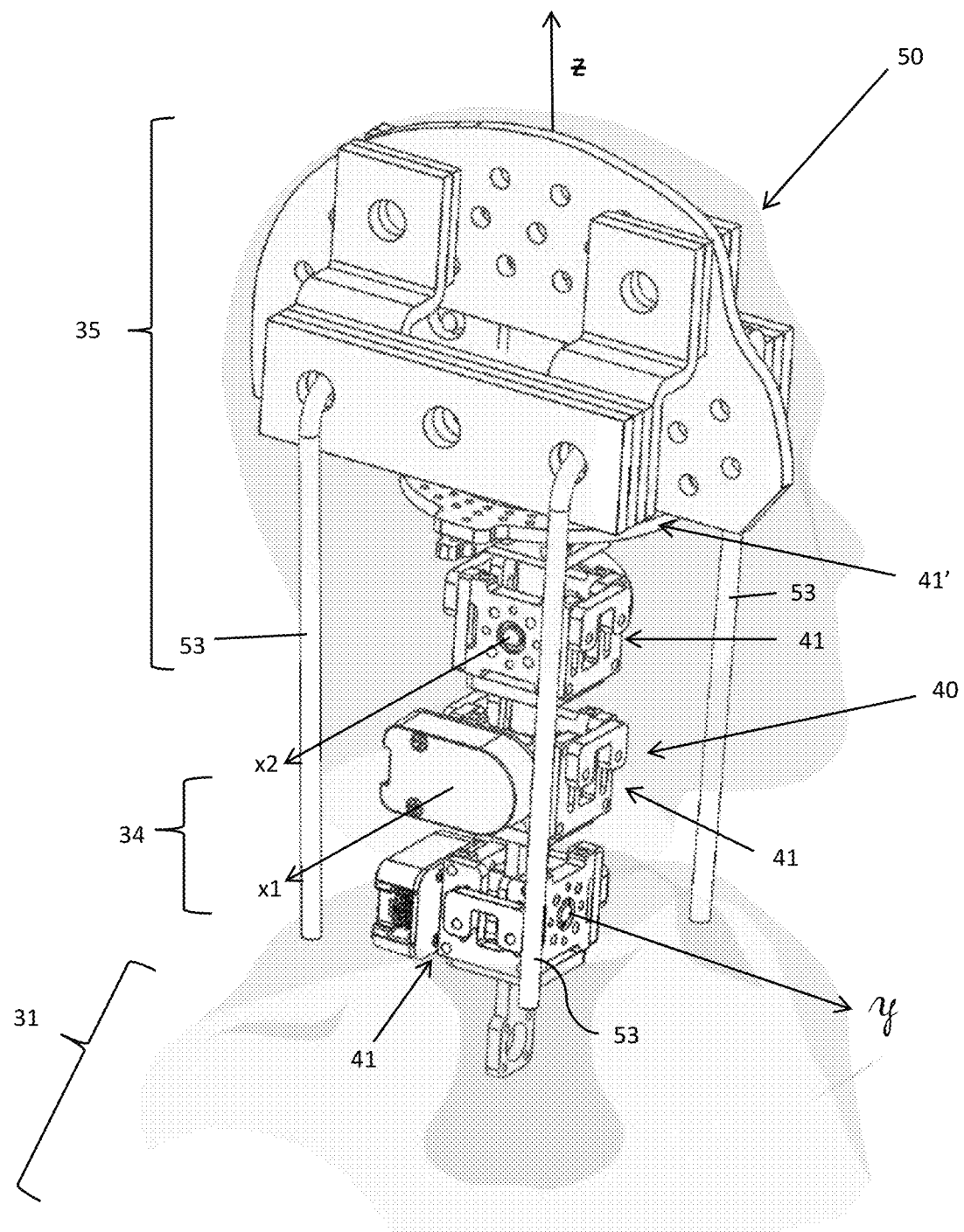
FIG. 2 is a perspective view of a neck mechanism and skull of a mannequin of the system of the present disclosure.

The neck mechanism 40 is designed to simulate movements of the cervical spine, again in terms of weight, dimensions, flexibility/resistance, center of mass, and/or range of motion. According to an embodiment, the neck mechanism 40 allows movements of the skull 50 relative to the torso 31 about three or more axes, with four distinct axes shown in FIGS. 2-5, although there may be fewer or more of these axes. The axes of the described embodiment are shown in FIG. 2. According to one possible embodiment, there are two flexion axes shown as X1 and X2. The flexion axes X1 and X2 may generally be aligned with the lateral axis of the mannequin 30. The flexion axes X1 and X2 may be generally parallel to one another. A rotation of the skull 50 relative to the torso 31 may be permissible about axis Z (aligned with the cranial-caudal axis of the mannequin 30), whereas a lateral flexion of the skull 50 relative to the torso 31 may be permissible by way of axis Y, generally aligned with the anterior-posterior axis of the mannequin 30.

To allow such rotational movements, the neck mechanism 40 may therefore have three or more joint units, such as four distinct joint units 41 as in FIGS. 2-5, also known as joint assemblies. The joint units 41 are serially interconnected. In an embodiment, an interconnection between one or more of sets of two adjacent joint units 41 forms a rotational joint of the type providing one rotational degree of freedom (DOF). In FIGS. 2 to 5, the three lower joint units 41 are generally similar in configuration, but are oriented differently. For example, a bottommost one of the joint units 41 has its rotational axis aligned with axis Y. The second and third of the joint units 41 from the bottom are aligned respectively with axes X1 and X2. A top of the joint units, shown as 41', is aligned with the Z axis. Other alignment arrangements are possible as well. The top joint unit 41' forms a rotational joint with the skull 50, and provides a fourth DOF to the assembly of the neck mechanism 40 and skull 50.

Figure 3:
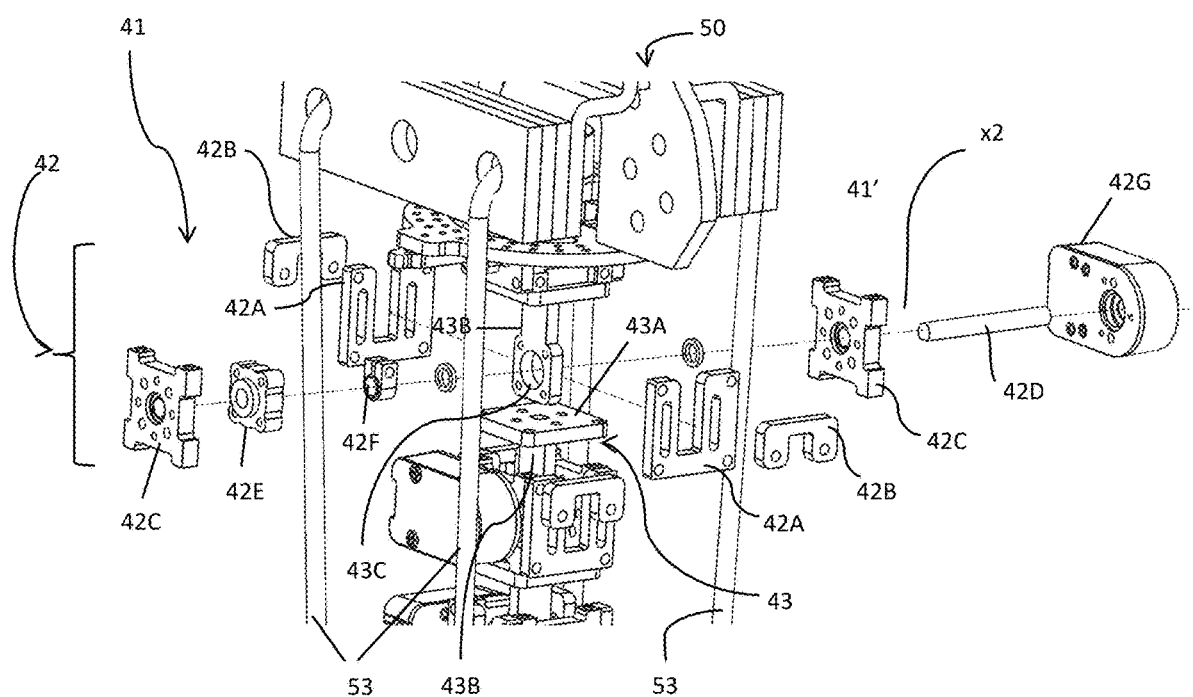
FIG. 3 is an exploded view of a joint unit of the neck mechanism of FIG. 2.

Reference is now made to FIG. 3, in which the third one of the joints 41 from the bottom is shown in greater details. The components of the third joint 41 are also present in the two bottom joints 41, and as such the two bottom joints 41 are not broken down to avoid redundancy in the text, and an excess of reference numerals in the figures. Each of the joint units 41 has a casing 42 and a base 43. The casing 42 may have a pair of side walls 42A, which serve a structural function in holding other parts of the casing 42 together. The side walls 42A face each other and are spaced apart from one another. The side walls 42A may each slidingly support an abutment 42B. For this purpose, the side walls 42A are shown as having vertical slots, by which the abutments 42B may be slidingly attached for vertical movement, until a desired position is reached. Fasteners (not shown) may then be used to fix the abutments 42B in position along the side walls 42A. As detailed hereinafter, the abutments 42B may serve to block movement of an adjacent joint unit 41/41' and hence be a limit stop.

Journal walls 42C are transversely oriented relative to the side walls 42A and are connected to them, to concurrently define a cavity. In an embodiment, the side walls 42A and the journal walls 42C could be made of a single monolithic piece, such as a tube (e.g., square section tube). The journal walls 42C each may have a bearing, to rotatingly support a shaft 42D. Any appropriate type of bearing may be used, including ball bearings, roller bearings, journal bearing, low-friction sleeves, etc. A shaft interface 42E is also mounted to the shaft 42D. The shaft interface 42E is used to connected the joint unit 41 with the adjacent joint unit 41/41' as detailed hereinafter. A clamping collar 42F may also be present to ensure that the shaft 42D remains in its casing 42. The walls 42A and 42C may be interconnected by any appropriate way (fasteners, welding, etc), but may also be monoblock or integrally formed. A sensor 42G (part of the sensors A of FIG. 1), is mounted to one of the walls of the casing 42, and senses the rotation of the shaft 42D. For example, the sensor 42G is a rotary encoder, or any other type of sensor used to measure an angular displacement of the shaft 42D. While the casing 42 is shown as a plurality of components, some of the components may be regrouped in monolithic pieces, etc.

The base 43 of the joint unit 41 supports the casing 42. Hence, the base 43 has a plate 43A upon which are connected the side walls 42A and the journal walls 42C. A plunger 43B projects from the plate 43A. In the illustrated embodiment, the plunger 43B projects downwardly relative to the Z axis, but the reverse arrangement is also contemplated, with the joint units 41 oriented such that the plungers 43B project upwardly relative to the Z axis.

In FIG. 3, the plunger 43B of the exploded joint unit 41 is only partially visible as it projects into the cavity of the lower joint unit 41. However, the plunger 43B of the upper joint unit 41' is visible, and has the same configuration as the one that is hidden. The plunger 43B has a head featuring a bore 43C, through which the shaft 42D may pass. The shaft interface 42E is fixed to the head of the plunger 43B, and as the shaft 42D passes through the shaft interface 42D, a rotational joint is formed between the plunger 43B of the upper joint unit 41/41' and the casing 42 of the lower joint unit 41. Accordingly, the exploded joint unit 41 of FIG. 3 allows rotational movement of the upper plunger 43B relative to the casing 42, along the second flexion axis X2. As for the bottom most one of the joint units 41, its plunger 43B visible in FIG. 2 may be anchored to the torso 31, although it may also provide a rotation DOF. Similar arrangements are reproduced between the first and second joint units 41 to allow lateral flexion about axis Y, and between the second and third joint units 41 to allow flexion about axis X1.

Figure 4:
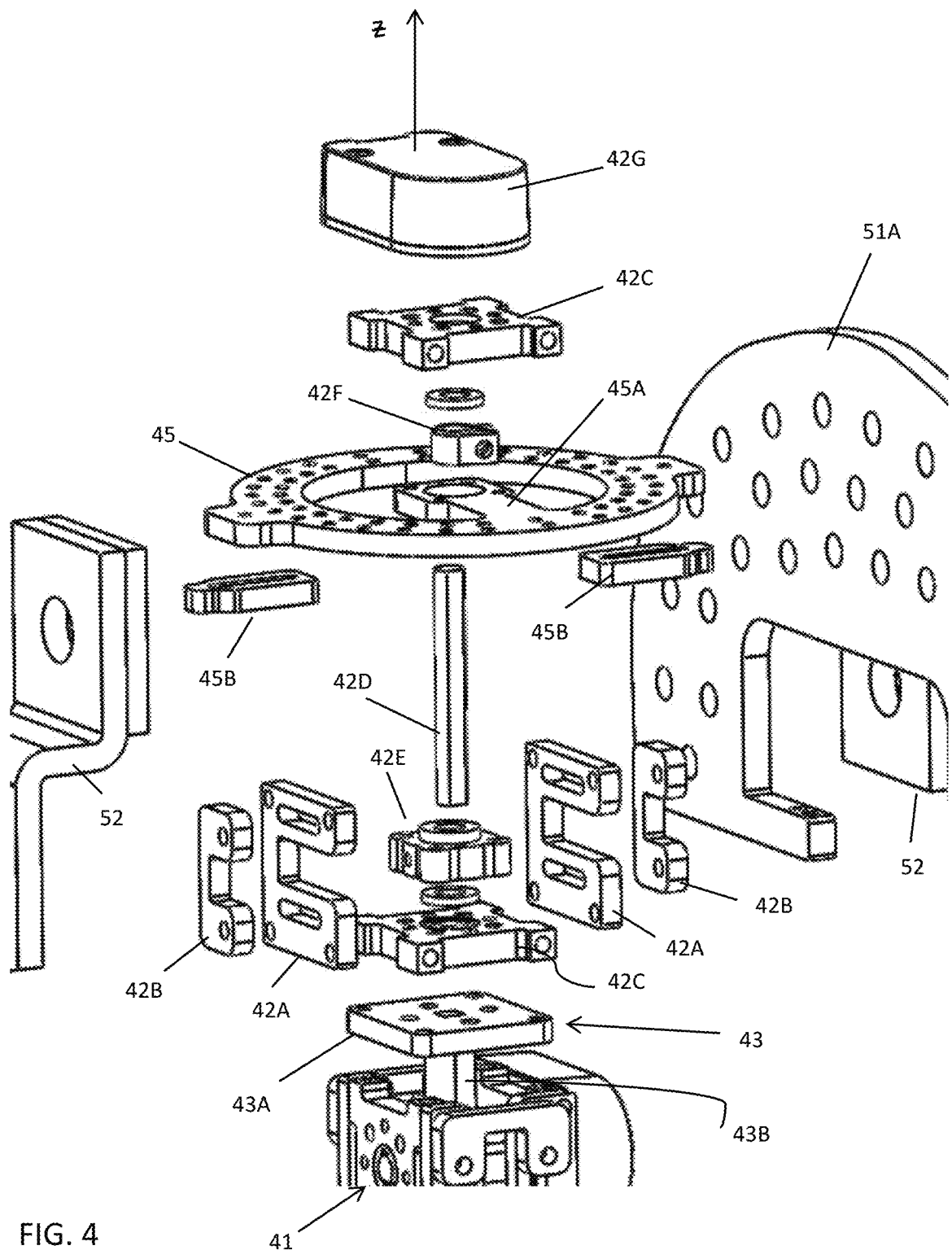
FIG. 4 is an exploded view of another of the joint units of the neck mechanism of FIG. 2.

Referring to FIG. 4, the top joint unit 41' is shown in an exploded view. The joint unit 41' has numerous components in common with the joint units 41 described above with reference to FIG. 3, whereby like reference numerals are indicative of like components. It is however observed that the shaft 42D is vertical in the top joint unit 41', whereby the side walls 42A and the journal walls 42C are oriented differently than in the other joint units 41. The shaft 42D and shaft interface 42E of the joint unit 41' are not connected to the plunger of another one of the joint units 41, but are instead connected to a plunger 45A centrally located in a disk 45 or disk ring. The plunger 45A has a similar configuration as the plungers 43B, but it is part of the disk 45. In an embodiment, the plunger 45A is an integral monoblock part of the disk 45. Accordingly, the disk 45 may rotate about the vertical axis Z by way of its connection to the shaft 42D of the joint unit 41'. A pair of tabs 45B may be on the underside of the disk 45. The tabs 45B may be used as attachments for a head shell that would be positioned onto the skull 50. The disk 45 is the interface between the neck mechanism 40 and the skull 50. The skull 50 is therefore anchored to the disk 45 and rotates with it. As an alternative to a disk 45, a frame could be used.

Figure 5:
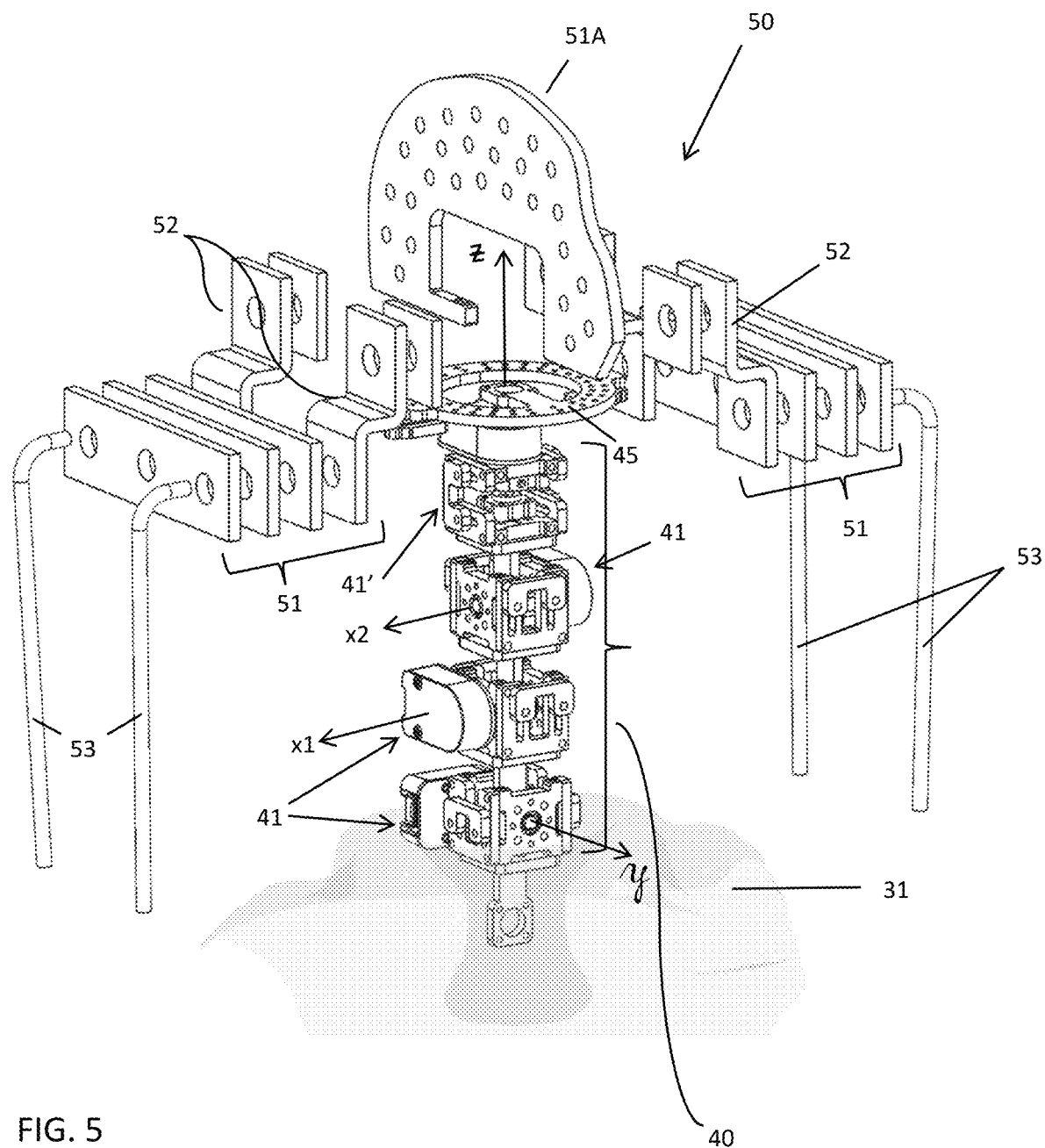
FIG. 5 is an exploded view of a skull of the neck mechanism of FIG. 2.

Referring to FIG. 5, the skull 50 may be composed of various plates 51 and brackets 52, with a central plate 51A mimicking the arcuate shape of a human skull. As the skull 50 may be the support for layers of material imitating soft tissue, the central plate 51A may define the rounded skull shape, whereas the other plates 51 and brackets 52 give the skull 50 its appropriate diameters and emulate the volume of a skull, as well as the weight and/or center of mass. Moreover, the plates 51 and brackets 52 provide some mass to the skull 50 and therefore allow it to be representative of a real skull. According to one embodiment, the arrangement of plates 51 and brackets 52 aims to have the center of mass of the skull 50 coincide with the center of mass of a human skull. It is therefore contemplated to use a material such as metal for many of the components of the neck mechanism 40 and skull 50. Also, tendons 53 may be used to emulate the elasticity of soft tissue. For example, the tendons 53 may be elastic bands or cables. Four of the tendons 53 are shown, to give some balance to the assembly. Although not shown, the tendons 53 are attached to anchor points on the torso 31. The elasticity and/or tension of the tendons 53 are also variables that may affect the realism of the mannequin 30.

Although a given configuration of joint unit 41/41' is detailed above, numerous other configurations are considered. For example, instead of using numerous joint units 41, it is contemplated to provide a joint with multiple rotational DOFs (such as a universal joint or a spherical joint). Moreover, the joint units 41 may have a different configuration, for instance by being simpler hinges made of a bracket and shaft. Sensors of different nature may be used, such as gyroscope, accelerometers, instead of magnetic rotary encoders or optical rotary encoders. Numerous other configurations apply. In contrast to a universal joint, the rotational axes Y, X1 and X2 do not share a common point of intersection. The spacing apart of the lateral (X1, X2) and anterior-posterior (Y) rotational axes in the neck mechanism 40 may be a realistic emulation of a human spine.

Figure 7:
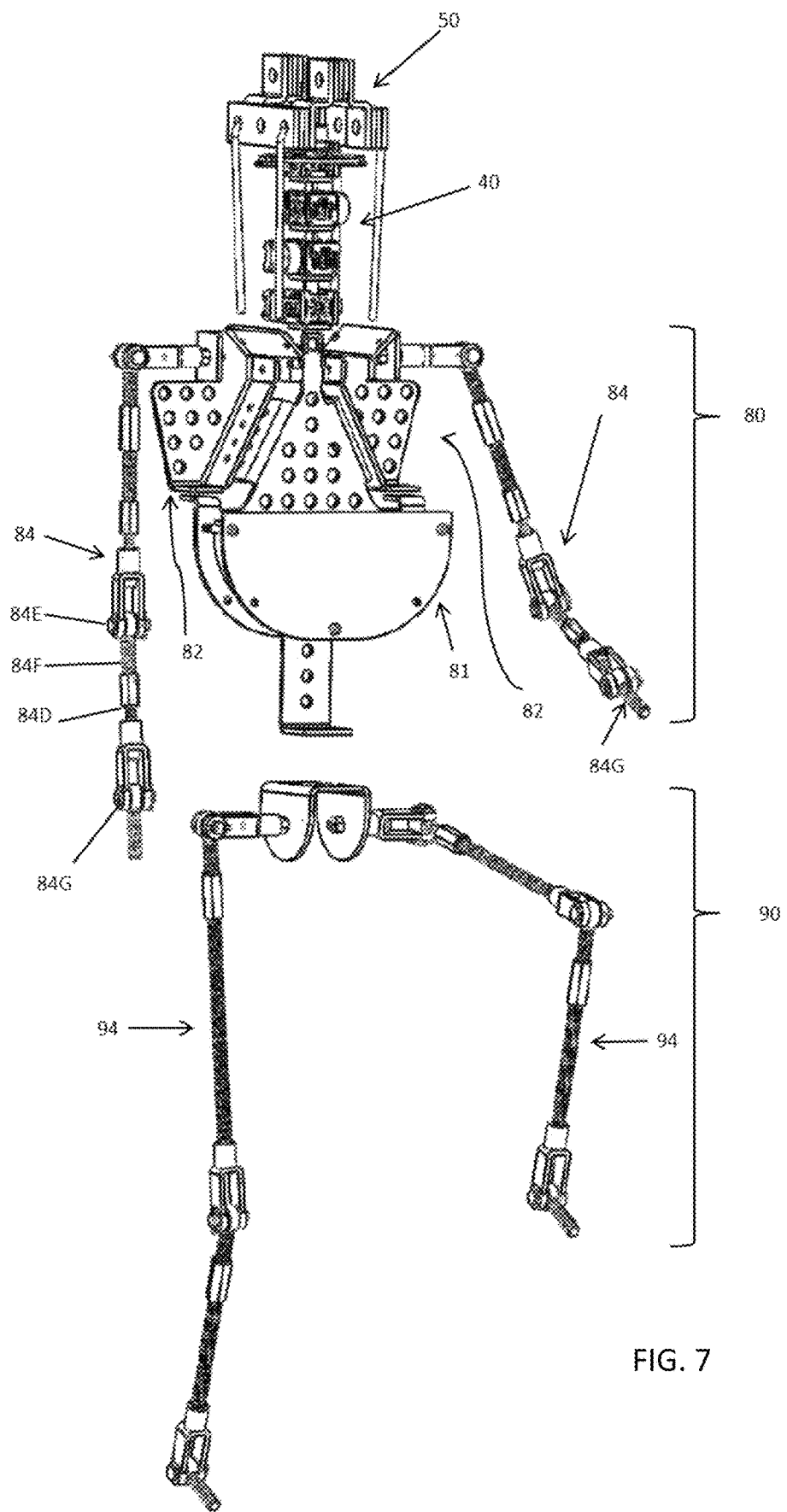
FIG. 7 is a schematic view of a mannequin skeleton that may be part of the system of FIG. 1.

Referring to FIG. 7, a mannequin skeleton is generally shown at 70. The mannequin skeleton 70 may or may not be part of the system 10. The neck mechanism 40 and skull 50 may be used with the mannequin skeleton 70, to emulate the inertia and elasticity of an unanimated human body, with the inertial of unanimated limbs. The skeleton 70 generally has a torso portion 80, and a lower body portion 90. In the illustrated embodiment, the demarcation between the torso portion 80 and a lower body portion 90 is around a waist line of the skeleton 70. According to an embodiment, the skeleton 70 may be overmolded with a resilient material, such as a rubber or silicone, that will provide a soft tissue appearance and flexibility to the skeleton 70. When the skeleton 70 is overmolded, it may have the appearance of the mannequin 30 of FIG. 1.

Figure 8:
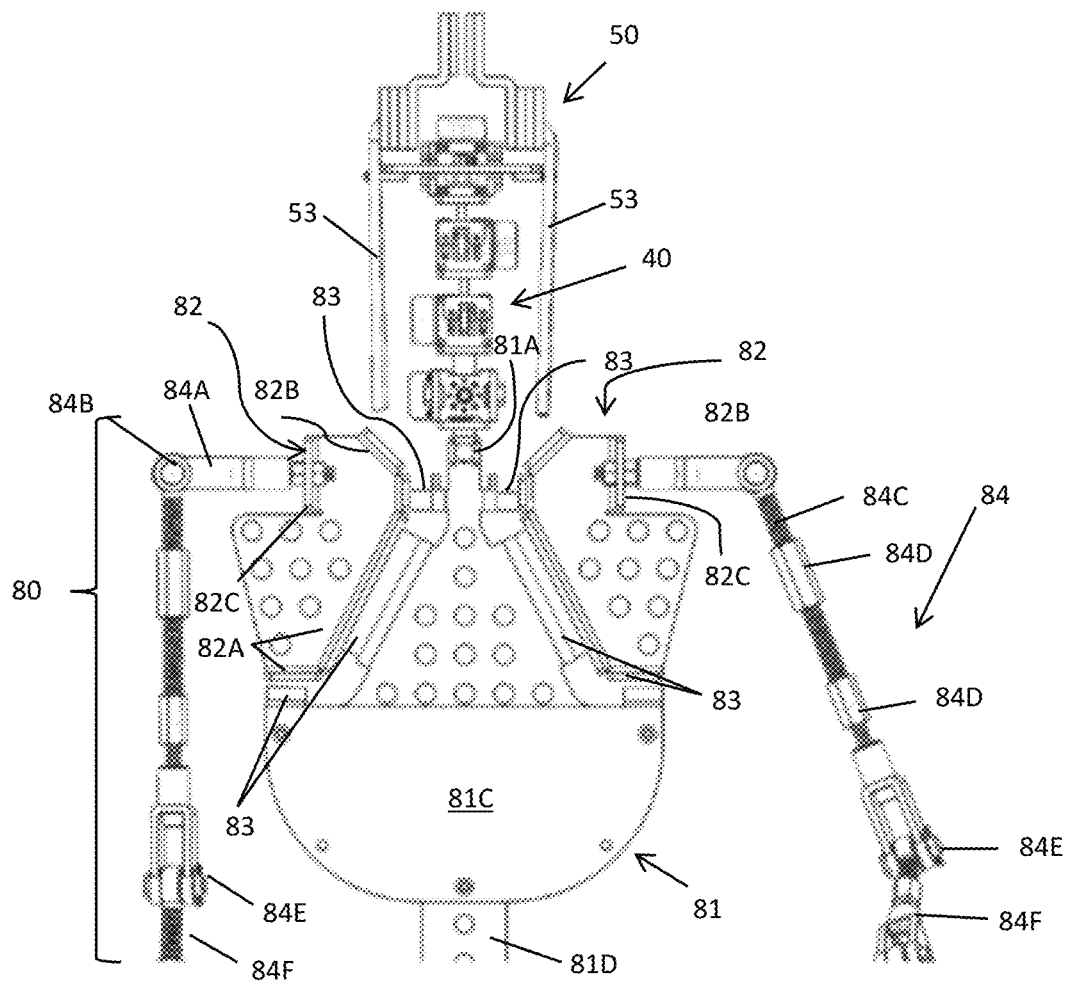
FIG. 8 is an enlarged schematic view of a torso of the mannequin skeleton of FIG. 7.

Referring to FIG. 8, the torso portion 80 has various components, generally described as a central member 81, shoulder blades 82, resilient joints 83 and arms 84. The central member 81 is the spinal component of the torso portion 80. In the illustrated embodiment, the central member 81 has a connector 81A for interface with the neck mechanism 40 (FIG. 2), for instance by way of fixed connection (no relative movement once locked to one another). As a possibility, the connection of the neck mechanism 40 with the torso portion 80 may be by way of a rotational joint, providing one, two or three rotational degrees of freedom (e.g., the connector 81A forming with the neck mechanism 40 a spherical joint or universal joint). The connector 81A is at an end of spinal member 81B, that extends along the cranial-caudal axis of the torso portion 80. The spinal member 81B may flare downwardly (though other contours are also considered), and join an abdominal member 81C. The spinal member 81B and abdominal member 81C have a width proportional to a rib cage. The abdominal member 81C may form a cavity to receive the electronic components of the system 10. A lower spinal member 81D projects downwardly from the abdominal member 81C, for connection to a lower body of the mannequin. The above configuration for the central member 81 is one of numerous possible configurations. The configuration described above is rigid to be representative of the rigidity of the rib cage portion of a human torso. Shoulder blades 82 are connected to the central member 81 by way of resilient joints 83, to emulate the soft tissue flexibility in the shoulder region of a human body. This soft tissue flexibility in the human shoulder region poses a challenge in roll-over of the body, as cervical spine stability can be affected by this looseness in the torso. The arrangement of central member 81, shoulder blades 82 and resilient joints 83 replicates the human torso in the roll-over manipulations.

Each of the shoulder blade 82 may have a polygonal body, though other shapes are contemplated as well, for instance made out of a plate. Connection strips 82A are provided along edges of the shoulder blades 82, for connection with the resilient joints 83. Three resilient joints 83 are present, with an elongated resilient joint 83 being between the spinal member 81B and each of the two shoulder blades 82. The resilient joints 83 may be made of a rubbery material, such as a rubber or polymer. For example, a silicone may be used as material for the resilient joints 83, with a suitable density to simulate the shoulder soft tissue (tendons, muscles). According to an embodiment, instead of the three discrete resilient joints 83, the overmolding of rubbery material joins the shoulder blades 82 with the central member 81, while emulating soft tissue flexibility present in a human shoulder area by the absence of a rigid connection between the shoulder blades 82 and the central member 81. Although not shown, elastic bands may also be provided to limit the free movement of the shoulder blades 82 relative to the central member 81. Hooking members 82B are on each shoulder blade 82, for attachment of the tendons 53 (FIG. 2). The hooking members 82B may have any appropriate shape or configuration, including holes, slots, projecting connectors, etc. A glenoid member 82C may be provided in each of the shoulder blades 82, for connection of the arms 84 to the shoulder blades 82. The glenoid member 82C may be any appropriate bracket for interfacing the arms 84 to the plates or bodies of the shoulder blades 82. As a possibility, the glenoid member 82C may be a rotational joint, providing one, two or three rotational degrees of freedom, to emulate a human shoulder joint. It is also observed that numerous holes are distributed over the torso portion, such as in the spinal member 81B and the shoulder blades 82. These numerous holes may be used for the connection of weights to adjust a position of a center of mass of the torso portion 80.

The arms 84 are illustrated as having a sequence of joints and links to reproduce the shoulder joint, upper arm, elbow and lower arm of a human body. According to an embodiment, each arm 84 has a sequence of a first rotational joint 84A, a second rotational joint 84B, an upper arm member 84C with movable weights 84D, an elbow rotational joint 84E, a lower arm member 84F and a wrist rotational joint 84G. This is one of numerous configurations. For example, instead of rotational joints, the arms 84 may have the members 84C and 84F, as well as a hand member (not shown, part of the rotational joint 84G), be interconnected by the resilient rubbery material overmolded onto the skeleton 70.

The combination of first rotational joint 84A and second rotational joint 84B connected to the glenoid members 82C of the shoulder blades 82 concurrently form two rotational DOFs between the shoulder blades 82 and the upper arm member 84C, similar to the motion range of a human shoulder joint. As an another example, a spherical joint is provided instead of the arrangement of the two joints 84A and 84B. The first rotational joints 84A have their rotational axis generally parallel to the X axis of the coordinate system, while the second rotational joints 84B have their rotational axis transverse relative to the rotational axis of first rotational joints 84A. The upper arm members 84C and/or the lower arm members 84F may be threaded rods upon which the weights 84D may be moved to adjust the position of the center of mass of the members 84C and 84F. The elbow rotational joints 84E and wrist rotational joints 84G have their axes of rotation generally transverse to a longitudinal axis of the members they are connected to, so as to reproduce elbow and wrist movements. More or less rotational joints may be present as well, such that the arms 84 have some flexibility at the shoulder, elbow and wrist joints.

Figure 9:
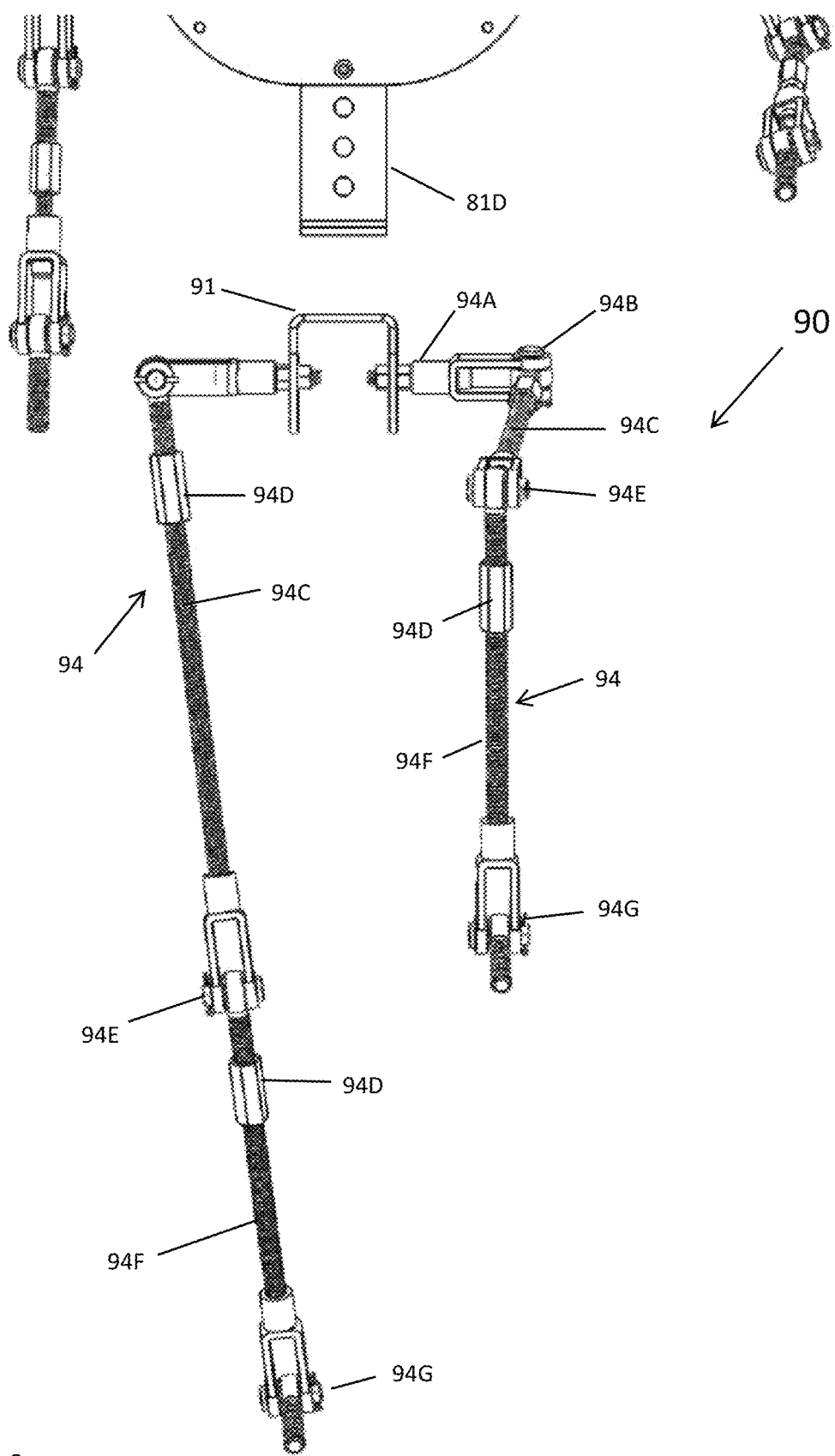
FIG. 9 is an enlarged schematic view of a lower body of the mannequin skeleton of FIG. 7.

Referring to FIG. 9, the lower body portion 90 has a pelvis member 91, and a pair of legs 94 projecting from the pelvis member 91. It is observed that the pelvis member 91 is not rigidly connected to the central member 81, with a gap being defined between the lower spinal member 81D and the pelvis member 91. According to an embodiment, a resilient joint (e.g., silicone) or the resilient rubbery material overmolded over the skeleton 70 flexibly join the torso portion 80 to the lower body portion 90. The pelvis member 91 may be an inverted U-shaped bracket to which the legs 94 are connected. The legs 94 may have a configuration similar to the arms 84. The legs 94 are illustrated as having a sequence of joints and links to reproduce the high joint, thigh, knee and lower leg of a human body. According to an embodiment, each leg 94 has a sequence of a first rotational joint 94A, a second rotational joint 94B, a thigh member 94C, movable weights 94D, a knee rotational joint 94E, a lower leg member 94F and an ankle rotational joint 84G, among possible configurations. Again, instead of rotational joints, the legs 94 may have the members 94C and 94F, as well as a foot member (not shown, part of the rotational joint 94G), be interconnected by the resilient rubbery material overmolded onto the skeleton 70.

The combination of first rotational joint 94A and second rotational joint 94B connected to the pelvis member 91 concurrently form two rotational DOFs between the pelvis member 91 and the thigh members 94C, similar to the motion range of a hip joint. As an another example, a spherical joint is provided instead of the arrangement of the two joints 94A and 94B. The first rotational joints 94A have their rotational axis generally parallel to the X axis of the coordinate system, while the second rotational joints 94B have their rotational axis transverse relative to the rotational axis of first rotational joints 94A. The thigh members 94C and/or the lower leg members 94F may be threaded rods upon which the weights 94D may be moved to adjust the position of the center of mass of the members 94C and 94F. The knee rotational joints 94E and ankle rotational joints 94G have their axes of rotation generally transverse to a longitudinal axis of the members they are connected to, so as to reproduce knee and ankle movements. More or less rotational joints may be present as well, such that the legs 94 have some flexibility at the hip, knee and ankle joints.

Figure 10:
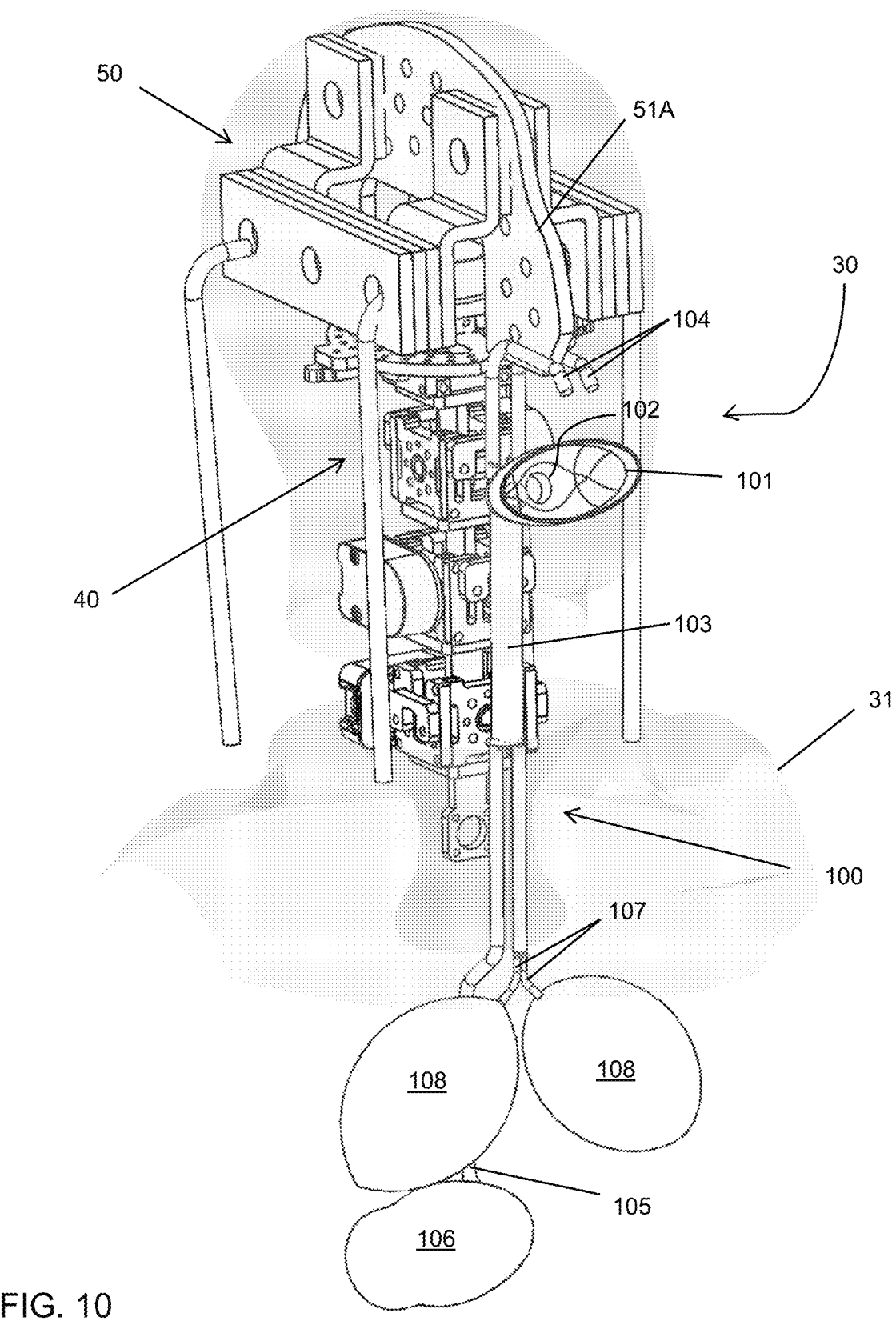
FIG. 10 is a perspective view of the neck mechanism and skull of the mannequin of FIG. 2, with an airway simulator apparatus.
Figure 11:
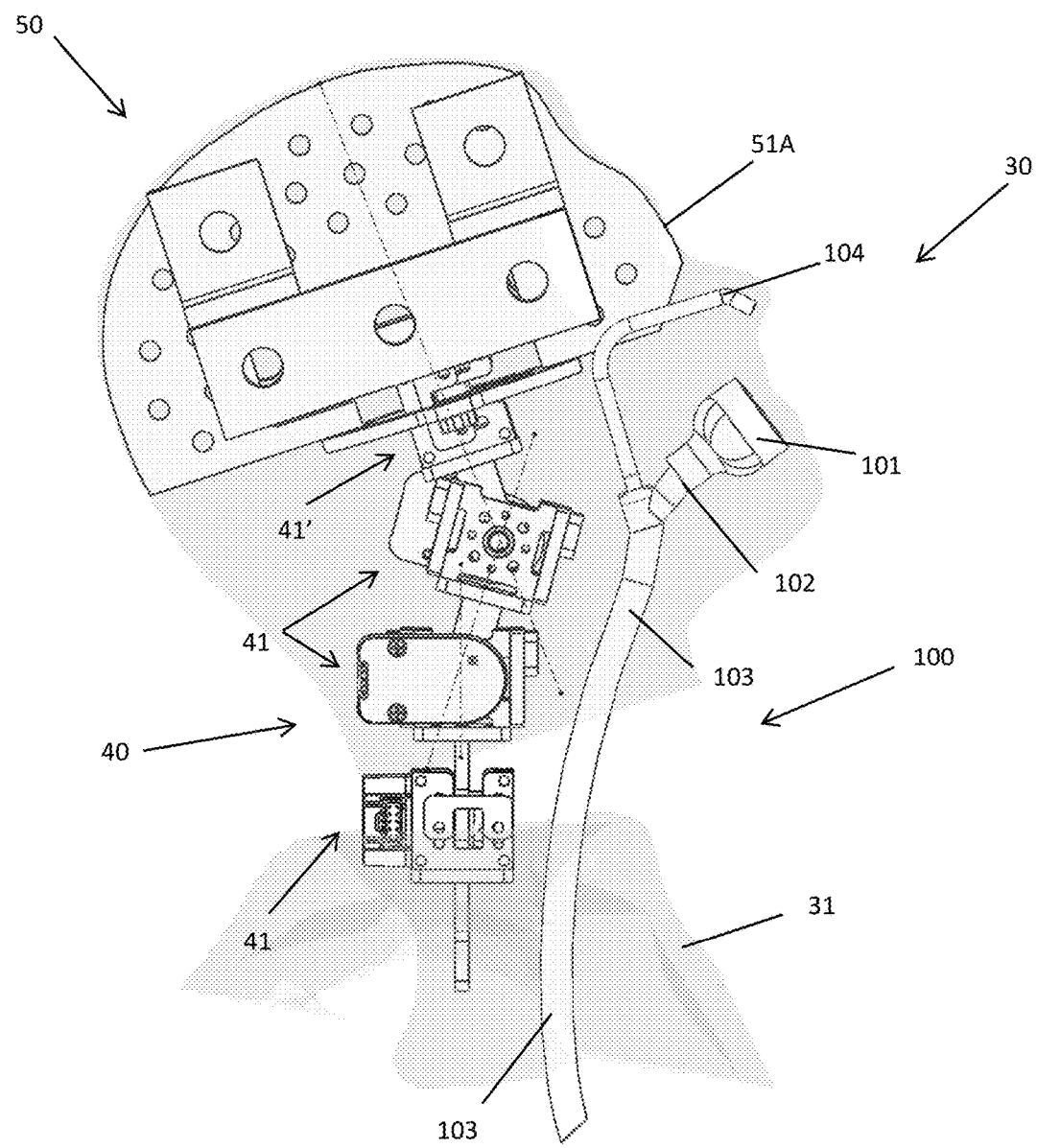
FIG. 11 is a side view of the assembly of the airway simulator apparatus, the neck mechanism and skull of the mannequin.

Referring to FIGS. 10 and 11, an airway simulator apparatus 100 is shown as part of the mannequin 30, used in collaboration with the torso 31, the neck mechanism 40 and the skull 50. Although not shown, the mannequin 30 featuring the airway simulator apparatus 100 may also have a mannequin skeleton 70. Moreover, as observed from FIGS. 10 and 11, the mannequin 30 may have a soft tissue membrane emulating skin, with the airway simulator apparatus 100 being accessible through a mouth of the mannequin 30, or through nostrils of the mannequin 30, the mouth and the nostrils being defined in the skin of the mannequin 30. The airway simulator apparatus 100 emulates anatomical airways, with at least the following components: a mouthpiece 101, a throat tube 102, a pharyngeal tube 103, nose tube(s) 104, oesophageal tube 105, stomach 106, tracheal tube(s) 107 and lungs 108.

The mouthpiece 101 opens to the month in the skin of the mannequin 30. The mouthpiece 101 may taper toward the throat tube 102. The throat tube 102 may then connect with the pharyngeal tube 103. In an embodiment, the pharyngeal tube 103 has a larger diameter than the throat tube 102. Nose tube(s) 104 also merge with the pharyngeal tube 103. As shown in FIG. 10, there may be a part of nose tubes 104, extending all the way to the pharyngeal tube 103. Alternatively, the nose tubes 104 may merge before connected to the pharyngeal tube 103. In the shown arrangement, the throat tube 102 and the pharyngeal tube 103 all merge with a common top end of the pharyngeal tube 103, for instance via an interface.

The pharyngeal tube 103 extends toward the torso 31. Though it bears the moniker "pharyngeal", the pharyngeal tube 103 may be longer than an anatomical pharynx. The pharyngeal tube 103 may then diverge into the oesophageal tube 105 connected to the stomach 106, and into the tracheal tubes 107 connected to the lungs 108. The stomach 106 and the lungs 108 may be expansible balloons or like vessel of elastic material, which can expand when pressurized. In an embodiment, the airway simulator apparatus 100 is generally airtight, such that air blown into the airway simulator apparatus 100 via the mouthpiece 101 or the nose tubes 104 may result in the inflation of the lungs 108, if not also of the stomach 106. Accordingly, maneuvers such as mouth-to-mouth resuscitation may be practiced with the mannequin 30 featuring the airway simulator apparatus 100. The airway simulator apparatus 100 is shown as having both a stomach 106 and lungs 108, but the airway simulator apparatus 100 may be limited to either one of the stomach 106 and lungs 108. The various tubes of the airway simulator apparatus 100 may be of a polymer that has a level of elasticity similar to that of human airways. The tubes of the airway simulator apparatus 100 may consequently be flexible tubing. The material used for the stomach 106 and/or the lungs 108 may be different, due to capacity of these human cavities to inflate. As the airway simulator apparatus 100 is under the skin of the mannequin 30, the arrangement emulates the elasticity of human tissue on the human airways. In an embodiment, the airway simulator apparatus 100 is connected to the skull 50, extends longitudinally along the neck mechanism 40. More specifically, the nose tubes 104 may be connected to the central plate 51A of the skull 50, among one possibility.

As direct laryngoscopy and tracheal intubation are necessary skills in airway management, and thus the airway simulator apparatus 100 may contribute to the training for airway management. Glottis visualization may be effect with the airway simulator apparatus 100, as it is necessary to perform successfully direct laryngoscopy and intubation. This requires proper positioning of head and neck to visualize the glottis and easily access the tracheal tube through the glottic opening, whereby tracking of the orientation of the neck mechanism 40 and skull 50 may be used in conjunction with the airway simulator apparatus 100. It is known that an optimal position of the patient's head and neck at the time of laryngoscopy and intubation may have an impact on the outcome, and one known position is referred to as "sniffing position" (SP). The system 10 may therefore be programmed to measure and/or give feedback about what constitutes the range of angles of the "sniffing position" for the neck mechanism 40 and skull 50, and monitor the rotations about X1, X2, Y and Z during simulated direct laryngoscopy and/or tracheal intubation.

Accordingly, the airway simulator apparatus 100 defines a realistic airway anatomy and landmarks including pharynx, larynx, epiglottis, arytenoids, false cords, true vocal cords, trachea, lungs, esophagus structures, with some or all of these imbedded in a flexible tubes of the airway simulator apparatus 100. As the airway simulator apparatus 100 is attached to the mechanical structure of the mannequin 30 (e.g., skull 50 as above, or otherwise neck mechanism 40), the airway simulator apparatus 100 changes position with the position of the skull 50 (neck flexion and head extension). The inertia of the skull 50 in combination with the degree of motions motion offered by the neck mechanism 40 allows a more realistic and sensitive positioning of the skull 50 to achieve the sniffing position for the airway simulator apparatus 100. The sensors in the neck mechanism 40 allow the measurements and feedback of the alignment of sniffing position during the intubation and subsequent superfluous head motions in all of the anatomical planes during the intubation maneuvers. The system 10 therefore proposes a quantitative approach to measure the efficacy of the c-spine stabilization and provide objective feedback during training. The proposed quantitative approach has the potential to be used for personalized feedback during training sessions.

Using the readings from the sensors A, the performance assessor module 20C may perform a characterization of the quality of transfer maneuvers based on the analysis of the temporal and spatial gap between the actual manoeuvre and the ideal representation of the motion, for example during a log-roll. In a perfect log-roll, both head and trunk segments move at the same time (i.e. temporal synchronicity), following concordant paths or "en-bloc" (i.e. spatial synchronicity). The global change in orientation for each segment should therefore be the same throughout the maneuver, and the sensors A can therefore be used to detect variations. Unwanted motion (e.g. head dropped in extension during the roll) will be captured in the global change in orientation experienced by the skull 50.

Temporal synchronization refers to the ability of the rescuers to move the trunk and the head at the same time. Poor communication between the rescuers or difficulty initiating and maintaining smooth motion of the trunk during the roll and push phases (e.g. due to a lack of strength with a large SP) may cause a delay between the motion of the head and the motion of the trunk, specifically at the initiation of a specific phase of a motion. Such delay will therefore be investigated during the initiation of the two phases requiring most of the motion (i.e. roll and push).

Spatial synchronicity refers to the idea that both segments move along a proportional arc of circle during both the roll and the push phases, represented by that desired line of identity on a 2D motion graph as in FIG. 6. Potential spatial quality indicators may therefore be monitored by the performance assessor module 20C based on the assumptions regarding ideal log-roll and its representation using a 2D motion graph approach). As such, the deviation from the desired line of identity during the roll and the push phases is investigated as a potential indicator, using the roll and the push best-fit line determined by a least-square approach. An efficient log-roll also assumes that the lead rescuer and assistant(s) have sufficient control over the motion. Perfect control will allow the rescuers to follow the same path throughout the roll and the push phases. Hence, it is hypothesized that the larger the spread between the two curves on the motion phase-plane, the worse the control and hence the result. One way of capturing that "spread" is by calculating the area between the curves. Hence, that area between the curves will be investigated as a possible indicator of acceptable and unacceptable log-rolls. Table 1 below provides performance and quality indicators for log-roll, using data measurements as in FIG. 6.

TABLE 1

Performance and Quality Indicators for Log-Roll

| CATEGORY | VARIABLE | EQUATION | DESCRIPTION |
|---|---|---|---|
| Performance measure | $ROMrel_{peak}$ | $Max(ROMrel)$ | Peak change in global orientation of the head relative to the trunk. |
| Temporal Quality Indicators | $Delay_{roll\_ini}$ | $|t_{Head\_Roll_{ini}} - t_{Trunk\_Roll_{ini}}|$ | Delay at roll Initiation |
| | $Delay_{roll\_end}$ | $|t_{Head\_Roll_{end}} - t_{Trunk\_Roll_{end}}|$ | Delay at Roll termination |
| Spatial Quality Indicators | $Slope_{Roll}$ | $|m_{roll} - 1|$ | Difference between the slope of the best-fit line of the Roll curve and the ideal line of identify. |
| | $Slope_{push}$ | $|m_{push} - 1|$ | Difference between the slope of the best-fit line of the Push curve and the ideal line of identity. |
| | $ABC_{Roll-Push}$ | $|AUC_{roll} - AUC_{push}|$ | Area contained between the curves from the Roll and the Push phases. |

The invention claimed is:

1. A mannequin comprising:
   arms; and
   a torso portion defined by
      a central portion extending generally along a cranial-caudal axis of the mannequin,
      shoulder blade portions connected to the central portion by joints so as to be rotatable relative to the central portion,
      glenoid joints connected to the shoulder blade portions, the glenoid joints each providing at least one rotational degree of freedom;
   wherein the glenoid joints interconnect the arms to respective ones of the shoulder blade portions.

2. The mannequin according to claim 1, wherein the glenoid joints each provide two rotational degrees of freedom.

3. The mannequin according to claim 1, wherein the glenoid joints each provide three rotational degrees of freedom.

4. The mannequin according to claim 1, wherein the arms are articulated.

5. The mannequin according to claim 4, wherein the arms are articulated to define at least an upper arm, a lower arm, and an elbow therebetween.

6. The mannequin according to claim 1, wherein the joints between the central portion and the shoulder blade portions are elastomeric joints.

7. The mannequin according to claim 1, including resilient rubbery material overmolded onto the mannequin to define a skin.

8. The mannequin according to claim 1, wherein a spinal member projects from the central portion, a pelvis member being connected to the spinal member.

9. The mannequin according to claim 8, further including articulated legs connected to the pelvis member.

10. The mannequin according to claim 9, wherein the articulated legs are each connected to the pelvis member by at least one rotational joint providing at least one degree of freedom of rotation.

11. The mannequin according to claim 1, further including a neck mechanism connected to and projecting from the torso portion.

12. The mannequin according to claim 11, wherein the neck mechanism is articulated and supports a skull at an end thereof.

13. The mannequin according to claim 11, wherein the neck has at least three joint units serially connected to provide joints for at least three rotational degrees of freedom (DOF), with a rotational axis of a first DOF configured to be aligned with a lateral axis of the mannequin, a rotational axis of a second DOF configured to be aligned with an anterior-posterior axis of the mannequin, and a rotational axis of a third DOF configured to be aligned with a cranial-caudal axis of the mannequin.

14. The mannequin according to claim 13, wherein a bottom one of the at least three joint units is adapted to be connected to the torso portion of the mannequin.

15. The mannequin according to claim 1, further including an airway simulator apparatus having at least one tube defining at least one opening at a level of a face of the mannequin, and being in fluid communication with at least one expandable balloon in the torso portion.

16. The mannequin according to claim 15, wherein the airway simulator apparatus includes a mouthpiece connected to the at least one tube at the at least one opening.

17. The mannequin according claim 16, wherein the at least one tube includes at least one nose tube having an opening defining a nostril.

18. The mannequin according to claim 16, wherein the at least one tube diverges into at least two tracheal tubes, with one said expandable balloon at an end of each said tracheal tube.

19. The mannequin according to claim 16, wherein the at least one tube diverges into an oesophageal tube, with one said expandable balloon at an end of the oesophageal tube.

20. The mannequin according to claim 16, wherein the at least one tube is flexible tubing.

* * * * *